United States Patent [19]
Engelhardt

[11] 3,767,835
[45] Oct. 23, 1973

[54] POTHEAD TERMINATION COMPRISING A VAPOR CONDENSER AND A TUBULAR CONDUCTOR EXTENSION CONTAINING A VAPORIZABLE LIQUID, AND METHOD

[75] Inventor: John S. Engelhardt, Hartsdale, N.Y.

[73] Assignee: Anaconda Company, New York, N.Y.

[22] Filed: June 7, 1972

[21] Appl. No.: 260,626

[52] U.S. Cl............ 174/11 BH, 29/592, 174/15 BH, 174/19
[51] Int. Cl.... H02g 15/22, H02g 15/28, H02g 1/14
[58] Field of Search................. 174/11 R, 11 BH, 174/12 BH, 14 BH, 15 BH, 16 BH, 18, 19, 31 R; 29/592, 630 R

[56] References Cited
UNITED STATES PATENTS
1,129,466  2/1915  Fortescue............... 174/15 BH X
2,748,184  5/1956  Nicholas................ 174/19
2,953,629  9/1960  Lapp..................... 174/15 BH X
3,067,279  12/1962 Baker.................... 174/15 BH UX
3,662,137  5/1972  Cleaveland............. 174/15 BH UX Primary Examiner—Laramie E. Askin
Attorney—Victor F. Volk

[57] ABSTRACT

A pothead for a high voltage cable, which may be of the type with a central pilot wire for monitoring the temperature of the cable conductor, comprises an electrically conducting tubular member compressed onto the cable conductor, a liquid condenser mounted outside the pothead insulator and a volatile liquid within the tubular member. The condenser may have radial fins in proximity to a corona ring and be surmounted by a temperature monitor and radio transmitter.

14 Claims, 2 Drawing Figures

FIG. I

POTHEAD TERMINATION COMPRISING A VAPOR CONDENSER AND A TUBULAR CONDUCTOR EXTENSION CONTAINING A VAPORIZABLE LIQUID, AND METHOD

BACKGROUND OF THE INVENTION

A high voltage cable invariably comprises at least one elongated conducting element, generally of metal, maintained at high potential when the cable is energized, a wall of insulation surrounding the conducting element, and a grounded sheath or conduit surrounding the wall of insulation. When the cable is terminated, if it were simply cut through, current would form an arc across the cut end of the insulation, from the conductor to the sheath. A cable is therefore generally terminated in a pothead which provides a high resistance path usually of porcelain, between the exposed conductor, or extension thereof, and the cable sheath. An essential element of a pothead is a porcelain or other dielectric container into which the cable, minus its sheath, is inserted. Because the sheath, proper, which may typically take the form of a lead extrusion or steel pipe, may be irregularly spaced from the wall of insulation, a grounded electrical shielding, which usually includes a semiconducting underlayer, is applied directly to the top surface of the cable insulation. Where this shielding wall is terminated, it is well known to be necessary to apply a so called stress relief cone which has the effect of increasing the thickness of the insulating wall and reducing the unit electrical stress at the section where the shielding is discontinued. The termination of the shielding on the surface of the stress relief cone should be situated within the pothead. The stress relief cone and the walls of the pothead provide electrical insulation but in so doing they also provide thermal insulation with the result that the portion of the cable that is enclosed in the pothead will become hotter than the remainder of the cable and any insulation failure will be most likely to occur there.

Modern potheads for high-voltage cables involve large and expensive structures weighing a ton or more and having procelain insulators 20 or more inches in diameter with lengths over 10 feet. They may include costly appurtenances such as temperature monitors and even radio transmitters as described in Engelhardt et al. U.S. Pat. Nos. 3,491,597 and 3,633,191. These complexities add, not only to the cost of any pothead failure, but to the difficulty of providing adequate cooling.

When a cable termination is made with a large pothead, such as a pothead for 230,000 volt service, the cable sheath is mechanically and electrically fixed to a heavy base plate having a central opening through which the core of the cable including the conductor, insulation, and shielding are caused to protrude upwardly. Customary preparation of the protruding core is then performed including exposure of an end of the conductor, trimming of the shielding and building the stress relief cone. After the core has been prepared, the pothead, which will subsequently be filled with dielectric fluid, is lowered over it by a crane or hoist and fastened to the base plate. No special provision is made in this customary procedure for removing the heat generated by the conductor within the pothead.

SUMMARY

I have invented a high-voltage cable pothead provided with means for cooling the interior of the pothead.

My novel cooled pothead is markedly economical in that it employs standard insulators and other pothead elements that are commercially available. My novel pothead achieves a cooling effect without substantially modifying the desirable electrical field of the termination.

My high voltage cable pothead which comprises an insulator and is used with a cable comprising a conductor and a thick wall of insulation surrounding the conductor, comprises entrance means into the pothead for the cable including its wall of insulation and an electrically conducting tubular member positioned to extend upwardly within the pothead and is at least partially filled with a liquid that is vaporizable at the operating temperature of the pothead. This member is mechanically and electrically joined to the conductor within the pothead which also comprises condensing means for the liquid exterior to the insulator and communicating with the tubular member. The tubular member preferably comprises within it a downwardly extending length of tubing for condensate from the liquid. Preferably my condensing means comprises radial fins and a corona ring adjacent to the fins having an outer radius at least equal to the radial extension of the fins. The joining means may advantageously comprise a sleeve extending from the tubular member and compressed over the conductor, and, when my pothead is used with a cable comprising a temperature monitoring means, such as a pilot wire, the sleeve may comprise a wall defining an opening leading to this means, the tubular member comprises an external lengthwise groove for the pilot wire with the pilot wire being positioned in the groove, and the pothead may comprise temperature monitoring means and a radio transmitter preferably mounted above the condensing means. Preferably my pothead comprises wrappings forming a continuous wall of electrical insulation over the conductor and the tubular member within the insulator and preferably also a stress relief cone extending upwardly over the cable, the joining means and at least a portion of the tubular member containing the vaporizable liquid.

In my method of terminating a high-voltage cable I expose a substantial length of the core of the cable including insulation shielding, beyond the sheath, remove sufficient of the insulation to expose a length of the end of the conductor and mechanically and electrically connect an electrically conducting tubular member to the conductor end. I wrap insulation such preferably as a wide sheet of oil-impregnated paper, around the member to the diameter of the insulation on the cable, and build a stress relief cone extending from the shielding over the core and preferably at least a portion of the tubular member. I then position a pothead over the tubular member and the exposed core, fit a vapor condenser, communicating with the tubular member, to the pothead, at least partially fill the tubular member with a liquid, vaporizable at the operating temperature of the pothead, fill the pothead with dielectric fluid and seal it.

DETAILED DESCRIPTION OF A PREFERRED EMBODIMENT

Figure 1:
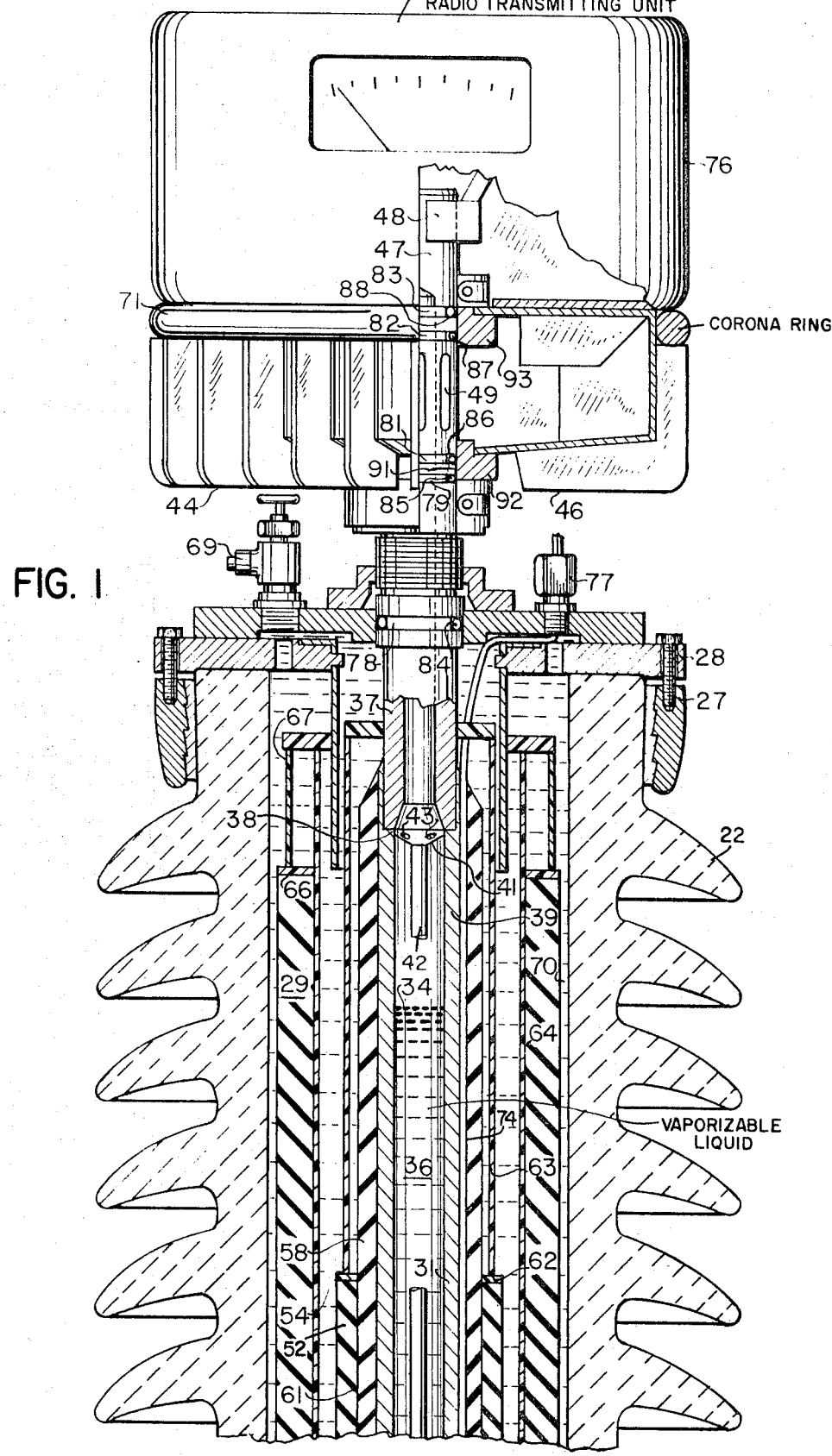
FIGS. 1 and 2 show a section of a pothead of my invention.
Figure 2:
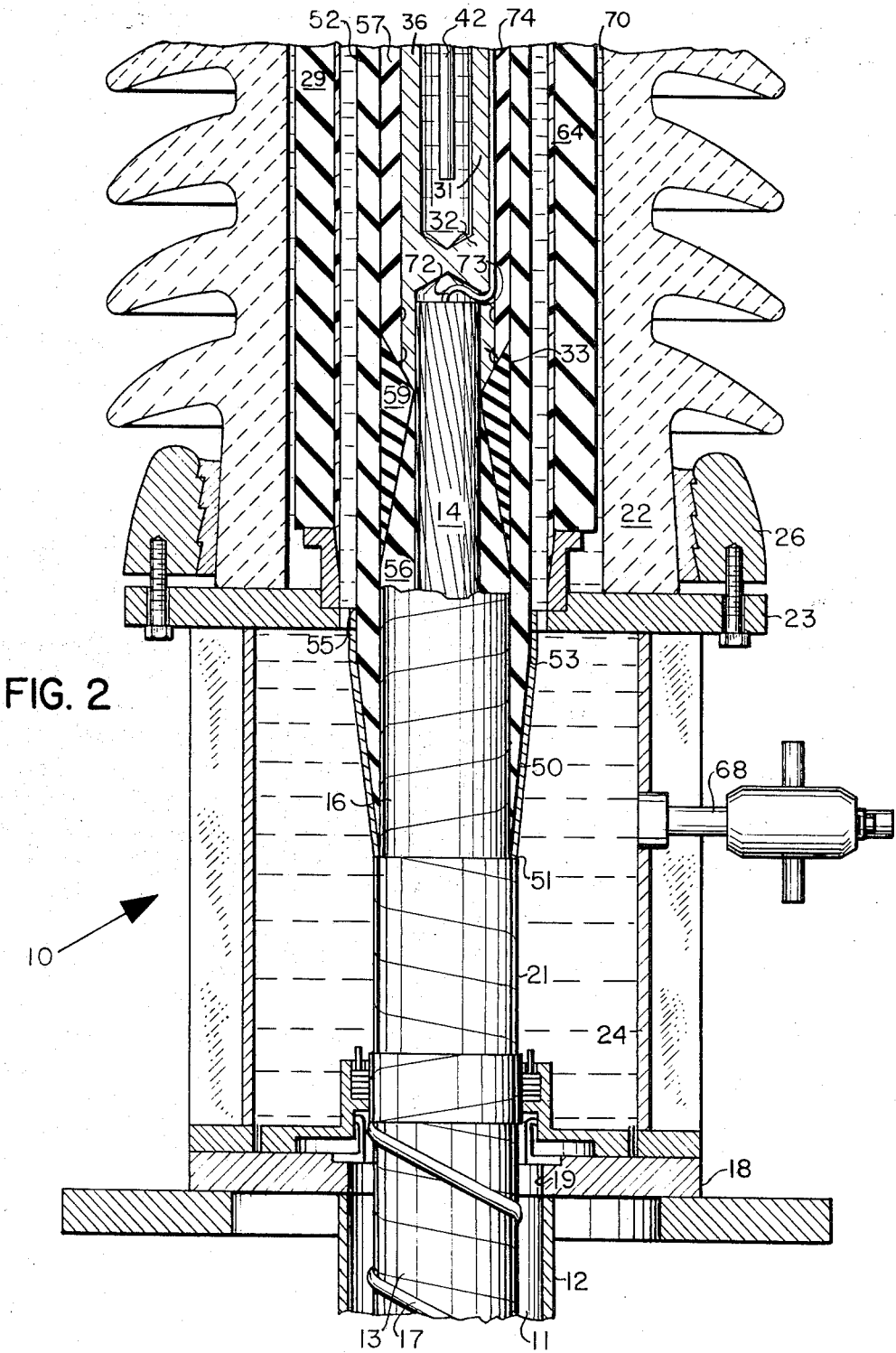

The pothead indicated generally by the numeral 10 is here applied to the termination of a known type of oil-filled pipe-type cable 11 characterized by the fact that the cable sheath consists of a steel pipe within which the cable core 13 having a stranded metal conductor 14 surrounded by oil saturated paper tape insulation 16 and protected by skid wires 17 has been pulled. The cable pipe may comprise steel for three-conductor cable but when the single phases are divided to enter the pothead they are customarily brought into branch joints terminating in short non-magnetic pipes 12, preferably of stainless steel or aluminum. The pipe 12 and skid wires 17 are terminated at a composite base plate 18 having a central opening 19 through which the remainder of the cable core 13 covered by insulation shielding tapes 21 extends upwardly into a porcelain insulator 22 supported on a bell cap 23 topping a metal bell 24 and firmly fixed to bronze cementing flanges 26, 27, the former of which is bolted to the cap 23 and the latter to a metal top plate 28. An oil-impregnated electrical condenser 29 of usual construction lines the insulator 22. So far I have described elements of a conventional pothead such as may be used for a 230 kv oil-filled cable. A novel feature, however, comprises a tubular copper member 31 with a solid section 32 that extends downwardly in a compression sleeve 33 that is solidly crimped onto the conductor 14. The member 31 can also be made from an open length of copper tube by inserting and silver soldering the section 32 attached to the sleeve 33. Other means of fabricating the member 31 will be apparent to persons skilled in metal fabrication. The member 31 is filled up to a point 34 with a vaporizable liquid 36. A fluorocarbon with a vapor pressure of 200 pounds per square inch at 65°C is suitable for the liquid 36 and such a liquid is commercially available under the trademark Freon from E. I. du Pont de Nemours and Co. The precise vapor-pressure characteristics of the liquid 36 are not critical, however, and may be varied with the temperature operating characteristics of the cable and the pressure that can be retained in the pothead. It is only necessary that a liquid be selected that will reflux when the pothead is in operation, as shall be explained. The member 31 has been constructed in sections silver soldered together with an upper section 37 of reduced diameter in its lower portion fitted onto a shoulder 38 of a lower section 39. The diameter of the section 37 can thus be made to fit through a standard pothead top plate but building the member 31 in sections also permits introduction of a copper funnel-like element having a conical flange 41 and long tubing extension 42 for the return of liquid condensate near the bottom of the member 31. Perforations 43 in the flange 41 allow vapors from the liquid 36 to pass upwardly to a vapor condenser 44 having radial fins 46 mounted above the insulator 22 and plate 28. The section 37 passes through the condenser 44 and has a solid portion forming the pothead stem 47 to which high voltage electrical connection is made by a clamp 48. Slotted perforations 49 within the condenser 44 provide communication between the member 31 and the condenser 44. By means of the tubing 42 the coolest liquid is returned close to the conductor 14 and convection occurs within the liquid 36 in addition to vaporization, adding to the efficiency of cooling. At a point 51 within the bell 24 of the pothead a stress relief cone 52 is initiated that is built up to its maximum diameter at a point 53 and thence extends to a point 54 more than half way through the insulator 22. The outer surface of this cone is made conducting in the usual way by the application of copper mesh tape 50 electrically continuous with the shielding 21 to a point 55. The member 31 must be capable of carrying the current in the conductor 14 since it has replaced the length of the conductor which would extend through a conventional pothead. The cable insulation 16 has been tapered in a cone 56 to expose the conductor to receive the sleeve 33. Wrappings 57, 58 of insulating quality of oil-impregnated paper sheet have been applied over the member 31 to a diameter equal to the diameter of the cable insulation before starting the cone 56 and the spaces between paper wrappings have been filled in with wrappings 59, 61 of oil-impregnated crepe paper. The stress relief cone 52 which is also built up of paper wrappings has been applied over the insulations 16, 56, 59, 57, 61, 58, and heat passing radially through the pothead from the cable would, prior to my invention, be required to pass through both the insulation and stress cone wrappings, the condenser 29 and insulator 22. At the end 54 of the stress relief cone I have mounted a conventional insulating washer 62 and insulating cylinder 63, a similar but longer cylinder 64 lines the condenser 29 and the latter is surmounted, in the usual way, with an insulating washer 66 and cylinder 67. Pipe connections 68 to the bell 24 and 69 to the plate 28 permit the introduction of dielectric fluid 70 which saturates the wrappings and fills all voids. The insulator of the cable 11 and insulating wrappings of the pothead 10 are paper but it is known to use plastics for insulating high voltage cables and terminations, and plastic film or paper such as, for example, polyolefin, polycarbonate, polyphenylene oxide may be used instead of cellulosic paper within the scope of the present invention.

The fins 46 provide possible points for corona discharge since the condenser 44 assumes the electrical potential of the conductor 14 and I have provided a smooth surfaced corona ring 71 adjacent to the top of the fins 46 to prevent such discharge. The radius of this ring is at least as large as the radial spread of the fins. The flange 27 which has a smooth, rounded surface also functions as a corona ring. In the absence of the flange 27 I recommend that an additional corona ring be positioned beneath the fins 46.

These corona rings may be omitted where the electrostatic field strength is not excessive, for example, at voltages below 161 Kv, or when the electrostatic field is controlled by other means, such as a properly designed temperature monitoring equipment housing or external controlling surfaces required by the connecting bus work, such as is common in EHV substation design.

The temperature of the conductor 14 is monitored by an insulated pilot wire 72 through its center and I have provided a hole 73 in the sleeve 33 and a vertical groove 74 in the member 31 so that this wire can be extended out of the pothead proper to a monitoring and radio transmitting unit 76 mounted upon the condenser 44. A bushing 77 provides for the wire 72 to pass through the plate 28. These features can, of course, be omitted where my pothead is used for a cable without pilot wire monitoring.

In terminating a cable with my pothead I have found the following method to be most advantageous. In a pipe type cable the pipe 12 is terminated at the plate 18 and the cable core pulled through it to expose a sufficient length for the connection. In a lead-sheathed cable the sheath is cut off for the same distance and the cut end connected to the plate. The skid wire (in pipe type cable) is cut back to the plate, the shielding trimmed and the insulation pencilled to expose a short length of the conductor for connecting to the member 31. The member 31, including the sleeve 33, sections 37, 39, 47, flange 41 and tubing 42 which will have been preassembled and silver soldered is then compressed onto the conductor 14 by means of a power tool after first threading the wire 72 through the hole 73. The wrappings 57, 58, 59, 61 are applied and the stress relief cone with the wire 72 fitted in the groove 74. The bell 24 with the bell cap 23 is lifted over the member 31 and bolted to the plate 18. The insulator 22 to which the flanges 26, 27 have been previously cemented is lowered by a hoist over the member 31 and bolted to the bell cap 23. The section 37 is circumferentially grooved at 78, 79, 81, 82, 83 for O-rings 84, 85, 86, 87, 88 which can be preapplied. The plate 28 is positioned, bringing the pilot wire 72 through the opening for the bushing 77 and bolted in place. The condenser 44 has a central opening 91 which permits it to be lowered over the member 31, and thick upper and lower plates 92, 93 that seal respectively against the O-rings 85, 86 and 87, 88. The condenser 44, with the corona ring 71 fixed to it is then mounted and locked with clamps. The liquid 36 is filled into the member 31 at any time before the cable is used by pouring it into the condenser 44 through a sealable opening, not shown. The pothead is filled with dielectric fluid through the pipe 68, venting through the pipe connection 69. The monitoring and transmitting unit 76 is mounted upon the condenser 44 and connected electrically to the wire 72 at the bushing 77.

I have invented a new pothead and method of which the foregoing description has been exemplary rather than definitive and for which I desire an award of Letters Patent as defined in the following claims.

I claim:

1. A pothead, comprising an insulator, for a high-voltage cable, said cable comprising a conductor and a thick wall of insulation surrounding said conductor, comprising:
    A. entrance means into said pothead for said cable having said wall of insulation,
    B. an electrically conducting tubular member positioned to extend upwardly within said pothead,
    C. a liquid vaporizable at the operating temperature of said pothead at least partially filling said member,
    D. means for mechanically and electrically joining said member to said cable conductor within said pothead, and
    E. condensing means for said liquid, exterior to said insulator, communicating with said member.

2. The pothead of claim 1 wherein said joining means comprises a sleeve extending from said member and compressible over said conductor.

3. The pothead of claim 1 comprising a downwardly extending length of tubing within said member for condensate from said liquid.

4. The pothead of claim 1 wherein said condensing means comprises a plurality of radial fins and comprising a corona ring adjacent to said fins, said ring having an outer radius at least equal to the radial extension of said fins.

5. A high-voltage termination comprising, in combination:
    A. a cable comprising a conductor and a thick wall of insulation surrounding said conductor,
    B. a pothead comprising an insulator,
    C. entrance means into said pothead for said cable, said cable being surrounded by said wall of insulation,
    D. an electrically conducting tubular member positioned to extend upwardly within said pothead,
    E. a liquid vaporizable at the operating temperature of said pothead, at least partially filling said member,
    F. means mechanically and electrically joining said member to said conductor within said pothead,
    G. condensing means for said liquid exterior to said insulator and communicating with said member, and
    H. wrappings within said insulator forming a continuous wall of electrical insulation over said conductor and said member.

6. The termination of claim 5 comprising a stress relief cone extending upwardly over said cable, said joining means, and at least a portion of said member containing said liquid.

7. The termination of claim 5 wherein said joining means comprises a sleeve extending from said member and compressed over said conductor, said cable comprises temperature monitoring means and said sleeve comprises a wall defining an opening leading to said temperature monitoring means.

8. The termination of claim 7 comprising a radio transmitter mounted above said condensing means for signals from said monitoring means.

9. The termination of claim 5 wherein said joining means comprises a sleeve extending from said member and compressed over said conductor.

10. The termination of claim 9 wherein said cable comprises an insulated pilot wire, said sleeve comprises a wall defining an opening for said pilot wire and said member comprises an external lengthwise groove for said pilot wire, said pilot wire being positioned in said groove under said wrappings.

11. The termination of claim 10 comprising temperature monitoring means sensitive to the resistance of said pilot wire, mounted above said condensing means.

12. The termination of claim 11 comprising a radio transmitter mounted therewith for signals from said monitoring means.

13. The termination of claim 5 comprising temperature monitoring means and a radio transmitter mounted above said condensing means for signals from said monitoring means.

14. The method of terminating a high-voltage electric cable comprising the steps of:
    A. exposing a substantial length of the core of said cable, including insulation shielding, beyond the sheath of said cable,
    B. removing sufficient insulation to expose a length of the end of the conductor of said cable,
    C. mechanically and electrically connecting an electrically conducting tubular member to said end, D. wrapping insulation around said member to the diameter of the insulation on said cable,
E. building a stress relief cone extending from said shielding over said core,
F. positioning a pothead over said member and the exposed length of said core,
G. fitting a vapor condenser communicating with said member to said pothead,
H. at least partially filling said member with a liquid vaporizable at the operating temperature of said pothead,
I. filling said pothead with dielectric fluid, and
J. sealing said pothead.

* * * * *